United States Patent
Sun et al.

(10) Patent No.: US 9,942,008 B1
(45) Date of Patent: Apr. 10, 2018

(54) SYSTEMS AND METHODS FOR RANGE EXTENSION BY TIME REPETITION

(71) Applicant: Marvell International Ltd., Hamilton (BM)

(72) Inventors: Yakun Sun, Sunnyvale, CA (US); Hongyuan Zhang, Fremont, CA (US); Lei Wang, San Diego, CA (US); Hui-Ling Lou, Sunnyvale, CA (US)

(73) Assignee: Marvell International Ltd., Hamilton (BM)

( * ) Notice: Subject to any disclaimer, the term of this patent is extended or adjusted under 35 U.S.C. 154(b) by 58 days.

(21) Appl. No.: 14/618,692

(22) Filed: Feb. 10, 2015

Related U.S. Application Data (60) Provisional application No. 61/937,850, filed on Feb. 10, 2014.

(51) Int. Cl.
| | |
|---|---|
| *H04L 1/18* | (2006.01) |
| *H04W 52/02* | (2009.01) |
| *H04B 7/06* | (2006.01) |
| *H04L 1/08* | (2006.01) |

(52) U.S. Cl.
CPC ............. *H04L 1/1887* (2013.01); *H04B 7/06* (2013.01); *H04L 1/08* (2013.01); *H04W 52/0248* (2013.01)

(58) Field of Classification Search
CPC ........... H04L 1/1887; H04L 1/08; H04B 7/06; H04W 52/0248
See application file for complete search history.

(56) References Cited

U.S. PATENT DOCUMENTS

| | | | | |
|---|---|---|---|---|
| 2006/0256708 A1* | 11/2006 | Wang | .................... | H03M 13/27 370/206 |
| 2007/0149242 A1* | 6/2007 | Kim | ...................... | H04J 11/004 455/525 |
| 2007/0177631 A1* | 8/2007 | Popovic | .................... | H04J 4/00 370/478 |
| 2007/0211786 A1* | 9/2007 | Shattil | .................... | H04B 1/707 375/141 |
| 2007/0253498 A1* | 11/2007 | Matsumoto | ......... | H04L 27/2608 375/260 |
| 2008/0285513 A1* | 11/2008 | Jung | .................... | H04W 72/042 370/329 |
| 2009/0109999 A1* | 4/2009 | Kuri | ...................... | H04L 1/0003 370/465 |
| 2010/0118800 A1* | 5/2010 | Kim | ...................... | H04L 1/0071 370/329 |

OTHER PUBLICATIONS

U.S. Appl. No. 14/523,678 "Range Extension PHY," Hongyuan Zhang, Oct. 24, 2014.
U.S. Appl. No. 14/582,568 "Systems and Methods for Introducing Time Diversity in WiFi Transmissions," Yakun Sun, Dec. 24, 2014.

\* cited by examiner

*Primary Examiner* — Mohammad S Anwar (57) ABSTRACT

Systems and methods are provided for extending the range of a transmitter by time repetition. The systems and methods may include receiving, at the transmitter block, and input of signals corresponding to data for transmission. The systems and methods may further include repeating the signals, reordering the signals, and operating on the signals in such a way that an output of signals from the transmitter block is dependent on a time-varying function and corresponds to the data for transmission.

20 Claims, 4 Drawing Sheets

SYSTEMS AND METHODS FOR RANGE EXTENSION BY TIME REPETITION

CROSS-REFERENCE TO RELATED APPLICATION

This disclosure claims the benefit of U.S. Provisional Patent Application No. 61/937,850 filed Feb. 10, 2014, which is hereby incorporated by reference herein in its entirety.

FIELD OF USE

This disclosure relates to wireless data transfer systems of the type that transmit data over long ranges, for example, many WiFi systems implementing the IEEE 802.11 standard are commonly used to provide wireless transfer of data in outdoor deployments, outdoor-to-indoor communications, and device-to-device (P2P) networks.

BACKGROUND OF THE DISCLOSURE

In systems of the type described above, range extension has been introduced in a non-time-varying manner. The IEEE 802.11ah standard introduced a range extension mode for data transmission using a Modulation and Coding Scheme (MCS) level, MCS0 rep2, which features a 1 MHz transmission based on a Fast Fourier Transform (FFT) of size 32, enabling a WiFi transmitter to repeat each Orthogonal Frequency-Division Multiplexing (OFDM) symbol two times in the frequency domain. Additionally, the IEEE 802.11ah standard also introduced a 1 MHz preamble to enable range extension, similarly by repeating an OFDM symbol two times in the frequency domain.

The processes for extending the range of a transmission discussed above allow for the repetition of a signal in the frequency domain. However, due to the frequency-selective nature of slow-varying channels, such as WiFi channels, these processes do not provide time diversity, which may be used to extend transmission range. Also, given that the signals are repeated in frequency and not in time, the use of early stopping schemes for improving power savings cannot be accomplished.

SUMMARY

In accordance with an embodiment of the present disclosure, a method is provided for extending the range of a transmitter by time repetition. The method may include receiving, at the transmitter block, and input of signals corresponding to data for transmission. The methods may further include repeating the signals, reordering the signals, and operating on the signals in such a way that an output of signals from the transmitter block is dependent on a time-varying function and corresponds to the data for transmission.

In some implementations, the transmitter block used for repeating the signals and reordering the signals may include at least one of a repetition and symbol level interleaver, repetition and OFDM symbol interleaver, and repetition and interleaving block.

In some implementations, the repetition and interleaving block receives signals processed by an encoder.

In some implementations, the repetition and interleaving block receives signals unprocessed by an encoder.

In some implementations, the transmitter block used for operating on the signals may include at least one of a time-dependent symbol-to-subcarrier mapper and a time-dependent interleaver.

In some implementations, the input of signals includes at least one of a grouping of bits and a grouping of symbols.

In some implementations, reordering the signals may include at least one of consecutive signal interleaving and repetition-wise interleaving.

In some implementations, extending the range of a transmitter by time repetition may further include specifying a transmission mode at the transmitter. The receiver may receive an input of signals corresponding to the data for transmission and the specified transmission mode. Further, signals may be operated on by the receiver, based on the specified transmission mode.

In some implementations, specifying a transmission mode further includes selecting at least one of a custom MCS level and packet length, a transmission mode and packet length, and an MCS level and a packet length.

In some implementations operating on the signals at the receiver further comprises detecting an MCS level and a packet length. The signals may be decoded. Further, based on the decoding, a repetition factor used by the transmitter may be determined.

In accordance with another embodiment of the present disclosure, a system is provided for extending the range of a transmitter by time repetition. The system may include a transmitter configured to send data to a receiver. Further, the system may include control circuitry configured to receive, at a transmitter block, an input of signals corresponding to data for transmission. The control circuitry may be further configured to repeat the signals, reorder the signals, and operate on the signals such that an output of signals from the transmitter block is dependent on a time-varying function and corresponds to the data for transmission.

In some implementations, the transmitter block used for repeating the signals and reordering the signals may include at least one of a repetition and symbol level interleaver, repetition and OFDM symbol interleaver, and repetition and interleaving block.

In some implementations, the repetition and interleaving block receives signals processed by an encoder.

In some implementations, the repetition and interleaving block receives signals unprocessed by an encoder.

In some implementations, the transmitter block used for operating on the signals may include at least one of a time-dependent symbol-to-subcarrier mapper and a time-dependent interleaver.

In some implementations, the input of signals comprises at least one of a grouping of bits and a grouping of symbols.

In some implementations, the circuitry configured to reorder the signals may be further configured to perform at least one of consecutive signal interleaving and repetition-wise interleaving.

In some implementations, systems for extending the range of a transmitter by time repetition may further include control circuitry configured to specify a transmission mode at the transmitter. The control circuitry may receive an input of signals corresponding to the data for transmission and the specified transmission mode. Further, the control circuitry may operate on the signals at the receiver, based on the specified transmission mode.

In some implementations, the system may include control circuitry configured to, when specifying a transmission mode, select at least one of a custom MCS level and packet length, a transmission mode and packet length, and an MCS level and a packet length.

In some implementations, the system may include control circuitry configured to, when operating on the signals at the receiver, detect an MCS level and a packet length. The control circuitry may be configured to decode the signal. Further, based on the decoding, the control circuitry may be configured to determine a repetition factors used by the transmitter.

BRIEF DESCRIPTION OF THE DRAWINGS

Further features of the disclosure, its nature and various advantages will be apparent upon consideration of the following detailed description, taken in conjunction with the accompanying drawings, in which like reference characters refer to like parts throughout, and in which.

DETAILED DESCRIPTION

This disclosure describes methods and systems for range extension of a transmission by time repetition. According to this disclosure, range extension may be accomplished by modifying existing blocks of a wireless transmitter, and by adding new blocks specifically designed to extend the transmission range by utilizing time repetition. Any or all of the blocks or layers described in the disclosure can be implemented by software instructions encoded on transitory or non-transitory computer-readable media.

Figure 1:
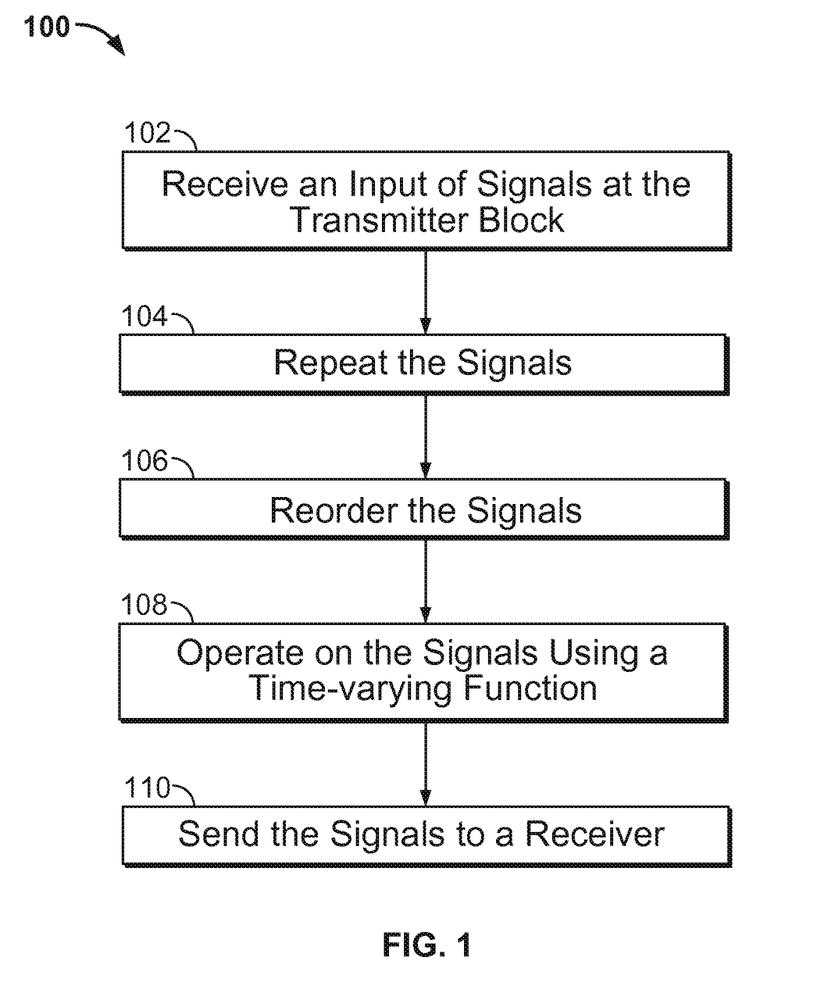
FIG. 1 shows a flow diagram of an exemplary process of applying time repetition to an input of signals before transmission, according to the present disclosure.

FIG. 1 depicts a flow diagram of an exemplary process of applying time repetition to an input of signals for transmission. It should be understood that the concept of time repetition described in this disclosure may be applied to both bits and OFDM symbols, and any other representation of data corresponding to the data for transmission. Bits and OFDM symbols are collectively referred to as signals in this disclosure. Embodiments disclosing time repetition at a symbol level and at a bit level is described in greater detail below.

During the course of a transmission, an input of signals may be received at a transmitter block at 102. The signals are repeated a number of times at 104. Then, at 106, the signals are reordered, which allows the repeated signals to be spread across the time domain. The process of reordering signals may be also referred to as interleaving; both terms are used interchangeably throughout this disclosure.

At 108, the signals are operated on using a transmitter block implementing a time-varying function, which allows for the introduction of time diversity, and extends the range of a transmission. Processes for introducing artificial time diversity in a transmitter are described in greater detail in Sun et al. U.S. patent application Ser. No. 14/582,568, which is hereby incorporated herein in its entirety. For example, at a symbol level, a symbol-to-subcarrier mapping may be made to be time-varying, thus enhancing range extension. In some embodiments, the time-varying operating of 108 may occur before the repeating of 104 and reordering of 106. Finally, at 110, the signals are transmitted to a receiver, after any other required processing of the signals in accordance with standard WiFi transmission processes.

Figure 2:
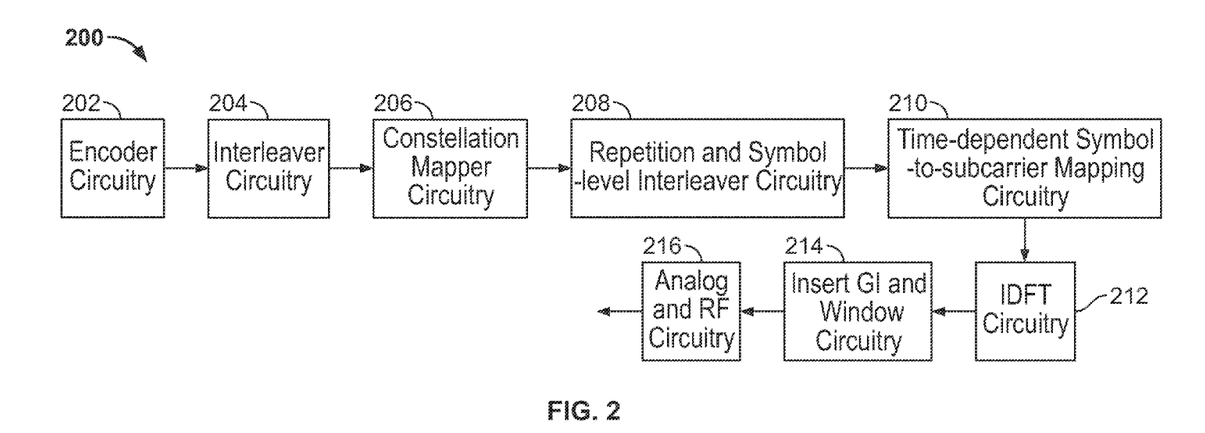
FIG. 2 is a schematic representation of the relevant blocks of a WiFi transmitter, in which symbol level time repetition occurs by first repeating and reordering the symbols, and then reordering the symbols in a time-dependent manner, in accordance with an embodiment of the present disclosure.
Figure 3:
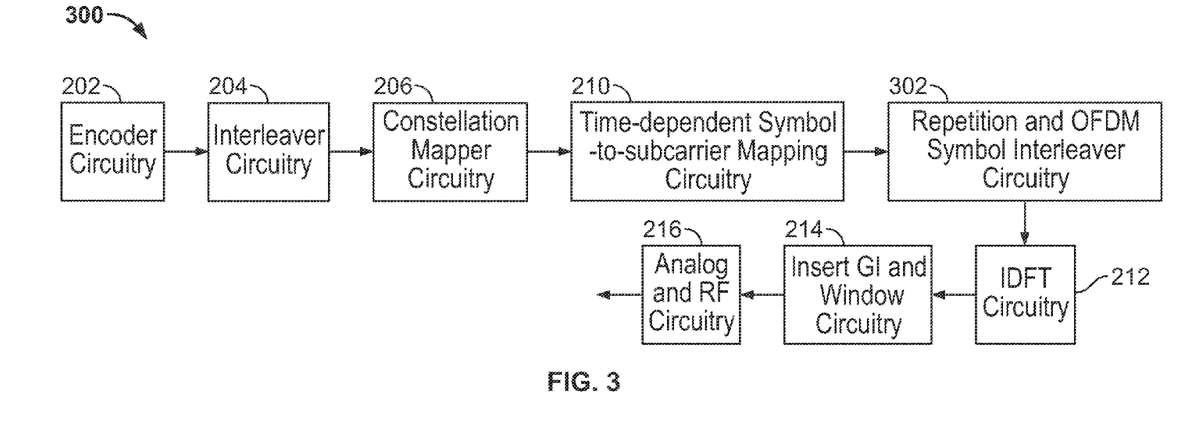
FIG. 3 is a schematic representation of the relevant blocks of a WiFi transmitter, in which symbol level time repetition occurs by first reordering the symbols in a time-dependent manner, and then by repeating and reordering the symbols, in accordance with an embodiment of the present disclosure.

To illustrate example embodiments of the application of symbol level time repetition in a wireless transmitter, reference is now made to FIG. 2 and FIG. 3. A schematic representation of the relevant blocks of a WiFi transmitter, in which symbol level repetition occurs by first repeating and reordering the symbols, and then reordering the symbols in a time-dependent manner, is depicted in FIG. 2. Encoder circuitry 202 encodes an input of bits corresponding to the data for transmission, and passes the bits to interleaver circuitry 204. After interleaving at 204, the coded and interleaved bits are modulated to a symbol sequence based on a constellation using the constellation mapper circuitry 206. The symbol sequence is then transmitted to a repetition and symbol level interleaver circuitry 208. At 208, each symbol is repeated K times. For example, when K is equal to four, each symbol is repeated four times. A grouping of N symbols, defined as $\{x_0, x_1, \ldots, x_{N-1}\}$, where x represents an individual symbol, may be repeated K times, resulting in a grouping of N×K symbols, further defined as the set of symbols $\{x_0, x'_0, \ldots, x'''_0, \ldots, x_{N-1}, \ldots, x'''_{N-1}\}$. After repetition, each symbol may be optionally rotated with a different phase.

The repeated symbols may then be passed through an interleaver to maximize time diversity. Symbol interleaving involves applying a permutation of the symbol sequence following repetition. Any known interleaver design may be applied at 208. Once the repeated symbols set, $\{x_0, x'_0, \ldots, x'''_0, \ldots, x_{N-1}, \ldots, x'''_{N-1}\}$, is interleaved, the set of interleaved symbols may be defined as $\{d_0, d_1, \ldots, d_{NK-1}\}$. The interleaving function may be defined as $d_i = x^{(n)}_m$, in which the i-th symbol after interleaving is the n-th repetition of the m-th symbol.

Two example embodiments of OFDM symbol interleaving are now considered: consecutive OFDM symbol interleaving and repetition-wise interleaving.

In consecutive OFDM symbol interleaving, the repeated symbol sequence, in which each symbol is repeated K times, is split into blocks, where each block contains K×M symbols. M is defined as the number of symbols that each OFDM symbol can carry. Each block is then interleaved. Within a given block, an interleaver may read every K-th symbol, and write the symbol into a buffer. When the interleaver reaches the end of the block, the reading and writing process may start from the first unread symbol. For example, the first block, defined as the set of symbols $\{x_0, \ldots, x'''_0, \ldots, x'''_{M-1}\}$, may be interleaved according to this manner such that an interleaved set of the symbols, $\{d_i\}$, where i is the index of the interleaved symbol, is defined as $\{x_0, \ldots, x_{M-1}, x'_0, \ldots, x'_{M-1}, \ldots, x'''_0, \ldots, x'''_{M-1}\}$. Optionally, a permutation may be applied every M symbols. As a result of consecutive OFDM symbol interleaving, the repeated symbols will belong to consecutive OFDM symbols. It is noted that the relative order of symbols in each OFDM symbol is not required to be identical.

In repetition-wise interleaving, the interleaver reads every K-th symbol in the repeated symbol sequence and writes the K-th symbol into the interleaved symbol sequence. When the interleaver reaches the end of the symbol sequence, the first unread symbol is read. Therefore, the signal set $\{x_0, \ldots, x'''_0, \ldots, x'''_{N-1}\}$ becomes interleaved signal set $\{d_i\}$, further defined as $\{x_0, \ldots, x_{N-1}, x'_0, \ldots, x'_{N-1}, \ldots, x'''_0, \ldots, x'''_{M-1}\}$. Additionally, a permutation is applied every N symbols in the interleaved symbol sequence. By applying repetition-wise interleaving, a complete repetition of the original symbol sequence is contiguous. The interleaved symbol sequence can then be split into K partitions. Each partition may contain only one repetition of each symbol, however, the relative order of symbols in each partition is not required to be identical.

After repeating and interleaving at 208, the symbols are sent to time-dependent symbol-to-subcarrier mapping circuitry 210. Here, a different mapping permutation may be applied each time. For example, if the symbol vector before mapping is defined as $d^{(t)}(i)$ for the t-th OFDM symbol, the symbol vector, for each subcarrier, becomes $s^{(t)}(i)$ after mapping. The time-dependent mapping may be further defined by the function $s^{(t)}(i)=d(t)$ $(\Omega(i; t))$. In effect, the permutation or mapping pattern depends on the number of the OFDM symbol. In a transmitter implementing time repetition, a time-dependent symbol-to-subcarrier mapper 210 may use a total of K mapping patterns. A mapping pattern may be used for N consecutive OFDM symbols, after which 210 may cyclically use the next mapping pattern for the next set of N consecutive OFDM symbols.

Two example embodiments of time-dependent OFDM symbol mappings are now considered: a mapping utilizing consecutive OFDM symbol interleaving and a mapping utilizing repetition-wise interleaving.

In an embodiment utilizing time-dependent mapping with consecutive OFDM symbol interleaving, a mapping pattern is used for every OFDM symbol. For example, in systems where each symbol is repeated four times, four mapping patterns may be utilized, with one mapping pattern implemented per one OFDM symbol. As an example, a third sequence of interleaved symbols may be mapped using the third mapping pattern (out of four distinct mapping patterns), effectively resulting in a set of symbols assigned to a third OFDM symbol. Therefore, each of the four repetitions of symbols is mapped using a different mapping pattern.

In the second example embodiment, a time-dependent mapping may be utilized with repetition-wise symbol level interleaving. Here, a single mapping pattern is implemented for all symbols corresponding to a given repetition. For example, in systems when each symbol is repeated four times, four mapping patterns may be utilized, with an identical mapping pattern utilized for all symbols belonging to the first repetition. Accordingly, symbols that correspond to the interleaved sequence of symbols belonging to the first repetition are divided, for example, into blocks of four symbols each, and each of these blocks is mapped using the first mapping pattern, each to a corresponding OFDM symbol. Meanwhile, the sequence of interleaved symbols corresponding to the second repetition is similarly divided into blocks of four symbols each, with each block being mapped using a second mapping pattern. Each block then represents a corresponding OFDM symbol.

Once the symbols are mapped to a subcarrier in 210, the symbols or representations of the symbols are sent to Inverse Discrete Fourier Transform (IDFT) circuitry 212, Guard Interval (GI) and window circuitry 214, and to analog and Radio Frequency (RF) circuitry 216, after which they may be transmitted to a receiver.

FIG. 3 is a schematic representation of the relevant blocks of a WiFi transmitter, in which symbol level repetition occurs by first reordering the symbols in a time-dependent manner, and then by repeating and reordering the symbols. In this embodiment, the initial processing of symbols is analogous to that described in FIG. 2. Once the symbols are received by constellation mapper circuitry 206, the outputted modulated symbols from 206 are sent to time-dependent symbol-to-subcarrier mapping circuitry 210, which may operate in accordance with the embodiments of 210 previously described in FIG. 2. As a result, the modulated symbols are mapped to subcarriers, and implicitly packed to OFDM symbols. These OFDM symbols may then be sent to repetition and OFDM symbol interleaver circuitry 302, which repeats each OFDM symbol K times. A phase shift may be applied to each repeated OFDM symbol, and a different symbol-to-subcarrier mapping may be applied to each repeated OFDM symbol. Alternatively, an additional subcarrier permutation for each OFDM symbol may be applied. Two example embodiments of the symbol-to-subcarrier mapping circuitry 302 are further discussed. In the first example embodiment, each OFDM symbol in a sequence of OFDM symbols is repeated K times, for example, the first OFDM symbol may be repeated four times. The second OFDM symbols may likewise be repeated four times, this repetition is further added to the output of 302. As a result, the output of 302 is characterized by consecutive blocks of OFDM symbols corresponding to the sequence of OFDM symbols before repetition. Each block of OFDM symbols contains a full set of repeated copies of the corresponding unrepeated OFDM symbol. In a second example embodiment, the entire sequence of OFDM symbols is repeated K times. For example, when K is equal to four, the sequence is repeated four times, with each copy of the sequence containing one repetition of an unrepeated OFDM symbol from the unrepeated sequence of OFDM symbols. After the symbols are processed by the repetition and OFDM symbol interleaver, the symbols are sent to the IDFT circuitry 212, and the process continues as previously described.

FIG. 2 and FIG. 3 described a transmitter implementing time repetition of symbol level signals for extending the range of a transmission. Time repetition may similarly be applied at a bit level. Example embodiments of bit level time repetition in a wireless transmitter are illustrated in FIG. 4 and FIG. 5, in which bit repetition is performed after bit encoding, and before bit encoding, respectively.

Figure 4:
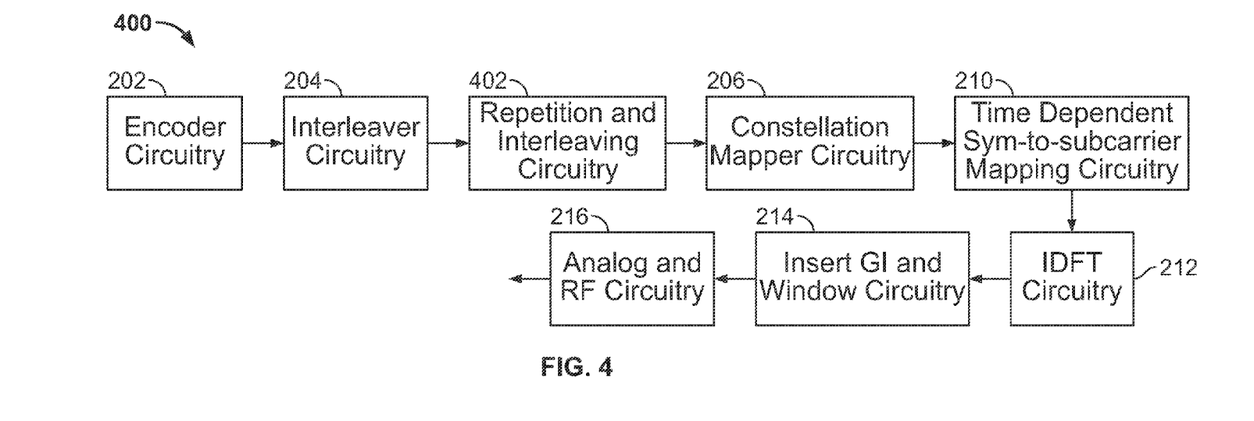
FIG. 4 is a schematic representation of the relevant blocks of a WiFi transmitter, in which bit level time repetition occurs by repeating and interleaving the bits after the bits are processed by an encoder, and then reordering the symbols corresponding to the repeated and interleaved bits in a time-varying manner, in accordance with an embodiment of the present disclosure.
Figure 5:
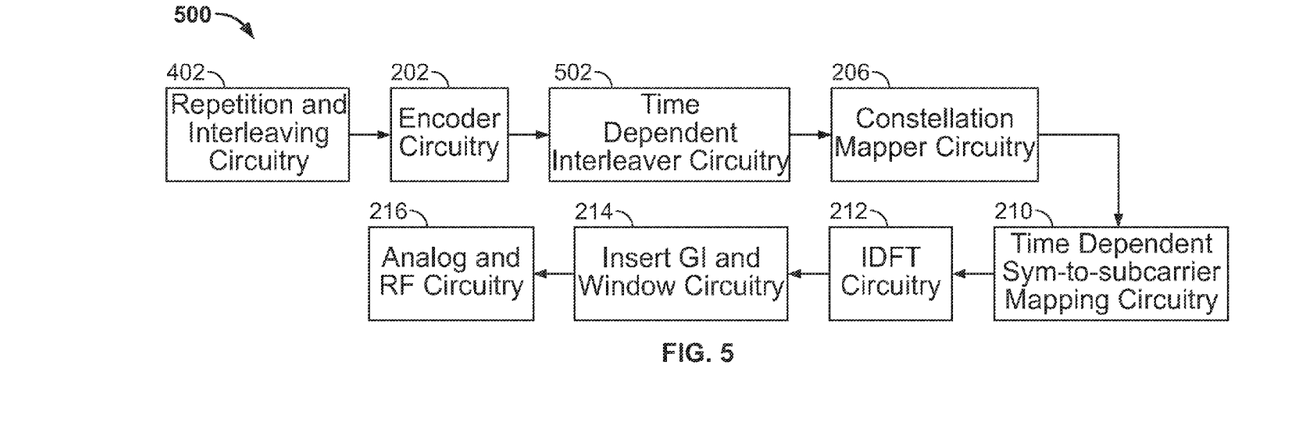
FIG. 5 is a schematic representation of the relevant blocks of a WiFi transmitter, in which bit level time repetition occurs by repeating and interleaving the bits before the signals are processed by an encoder, and then reordering the symbols corresponding to the repeated and interleaved bits in a time-varying manner, in accordance with an embodiment of the present disclosure.

FIG. 4 depicts a schematic representation of the relevant blocks of a WiFi transmitter, in which bit level time repetition occurs by repeating and interleaving the bits after the bits are processed by an encoder, and then by reordering the symbols corresponding to the repeated and interleaved bits in a time-varying manner. Here, encoder circuitry 202 encodes an input of bits corresponding to the data for transmission, and passes the bits to interleaver circuitry 204. After interleaving at 204, the encoded and interleaved bit sequence is passed to repetition and interleaving circuitry 402. At 402, the sequence is repeated K times, or block-coded at a rate of 1/K. The repeated or block-coded bit sequence is then interleaved, so that the repeated bits are spread across multiple OFDM symbols, which may or may not be contiguous. In effect, the transmitter may be able to exploit time diversity. Additionally, frequency diversity may also be exploited by using this process.

The repeated and interleaved bit sequence generated in 402 is then sent to constellation mapper circuitry 206. The modulated symbol sequence output of 206, corresponding to the repeated and interleaved bit sequence, is then passed to a time-dependent symbol-to-subcarrier mapping circuitry 210. Here, the symbol sequence is mapped to subcarriers in a time-dependent fashion. Two previously described example embodiments of the 210, one utilizing consecutive OFDM interleaving, the other utilizing repetition-wise interleaving, may be applied here. In consecutive OFDM interleaving, the repeated bits of one bit will belong to consecutive OFDM symbols after interleaving. The relative order of bits in each OFDM symbol may not necessarily be identical. A different symbol-to-subcarrier mapping pattern may be used for each OFDM symbol for the consecutive OFDM symbols. In an example embodiment of an interleaver utilizing consecutive OFDM symbol interleaving, the repeated bit sequence is split into blocks, with each block containing $N_{CBPS} \times K$ consecutive bits, where $N_{CBPS}$ is defined as the number of coded bits per symbol. Then, for each block, the interleaver may read out every K-th bit in the repeated bit sequence, and write that bit into the output. Upon reaching the end of the bit sequence, the interleaver may then re-start the process from the first unread bit in the bit sequence. Optionally, the interleaver may additionally apply a permutation every $N_{CBPS}$ read bits.

In the second example embodiment, a repetition-wise interleaver design may be applied to the symbol-to-subcarrier mapper. Here, a complete repetition of the original bit sequence (after a bit flip operation) may be contiguous. Similarly to the consecutive OFDM symbol interleaver, the relative order of bits in each repetition may not necessarily be the same. In a repetition-wise interleaver, a different symbol-to-subcarrier mapping pattern may be used for all OFDM symbols in one repetition. In an example interleaver design, the interleaver may read out every K-th bit in the repeated bit sequence and write the bit to the output. Upon reaching the end of the bit sequence, the interleaver may restart the reading process from the first unread bit. An optional permutation may be applied per each repetition.

Once the signals are mapped to subcarriers in a time-dependent manner, the symbols are further transmitted to subsequent blocks 212, 214, 216, as previously described.

FIG. 5 depicts a schematic representation of the relevant blocks of a WiFi transmitter, in which bit level time repetition occurs by repeating and interleaving the bits before the bits are processed by an encoder, and then by reordering the symbols corresponding to the repeated and interleaved bits in a time-varying manner. At 402, the info bit sequence, or Physical Layer Convergence Protocol (PLCP) Service Data Unit (PSDU) sequence, is repeated K times, or block-coded at a rate of 1/K. The info bit sequence is then interleaved and repeated. As before, the bit interleaver will spread the repeated bits across multiple OFDM symbols, with the intention of exploiting time, and potentially frequency diversity. The bit sequence is then passed to encoder circuitry 202, and then to time-dependent interleaver circuitry 502, constellation mapper circuitry 206, and time-dependent symbol-to-subcarrier mapping circuitry 210. It is noted that time dependence may be applied at both block 502 and block 210, or only at one of these blocks. For example, if time dependence is applied at 210, block 502 may be replaced with a non-time-dependent interleaver (such as interleaver 204, presented in FIG. 4). Time-dependent interleaver circuitry 502 may utilize, for example, repetition coding, which spreads the repeated info bits in such a way that the corresponding output of encoder 202 belongs to consecutive OFDM symbols. A similar example design of an interleaver may be implemented as in FIG. 4, the block size may be reduced by the coding rate of encoder 202. A different baseline interleaver pattern or symbol-to-subcarrier mapping pattern per OFDM symbol for consecutive OFDM symbols, containing encoded bits for a repeated info bit, may be applied.

In a second example embodiment, repetition-wise interleaving may be used. Here, the repeated info bit sequence is reordered in such a way that a complete original bit sequence is contiguous. Again, a similar example interleaver may be applied as in FIG. 4, with the size of a partition being the PSDU sequence length. Lastly, a different baseline interleaver and symbol-to-subcarrier mapping per repetition may be applied.

Figure 6:
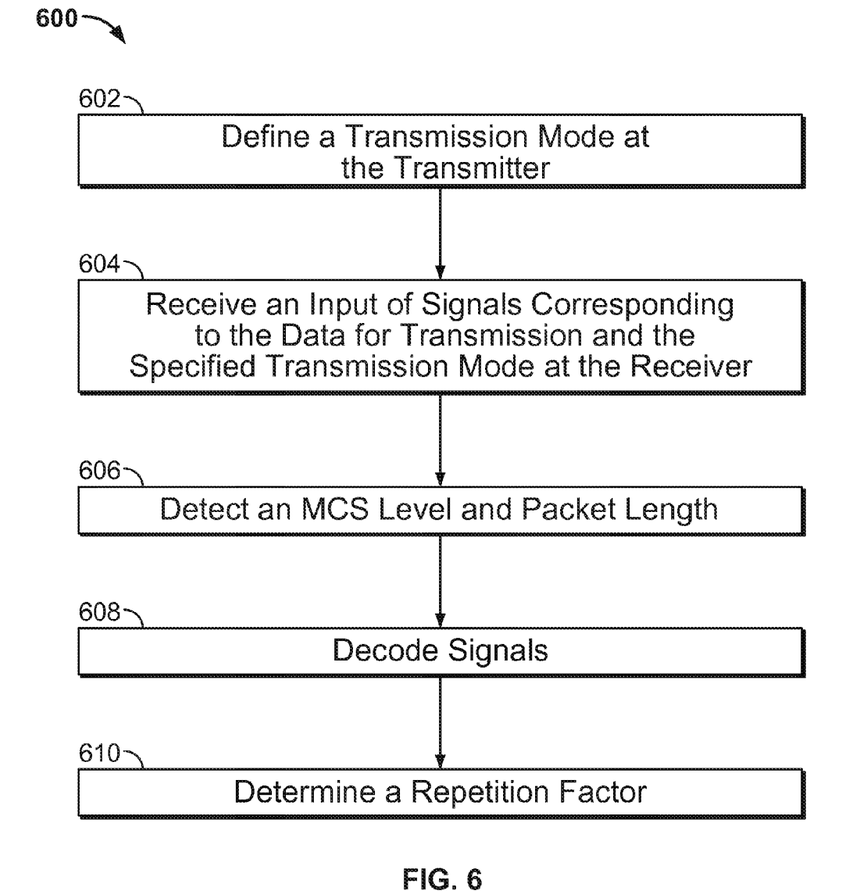
FIG. 6 shows a flow diagram of an exemplary process of receiving, at a receiver, an input of signals corresponding to the time repeated transmission at a receiver, according to the present disclosure.

FIG. 6 depicts a flow diagram of an exemplary process of receiving, at a receiver, an input of signals corresponding to the time repeated transmission, according to the present disclosure. To improve coverage, a new MCS level and preamble design may be introduced to add repetition coding and modulation. Such methods for improving the coverage in the frequency domain are described in greater detail in Zhang et al. U.S. patent application Ser. No. 14/523,678, which is hereby incorporated herein in its entirety. Applying similar principles in the time domain may help extend range. In addition to extending the range, an MCS or transmission mode of repetition in the time domain may mitigate flashlight-style interference, and allow for power-saving schemes to be implemented at the receiver with the utilization of an early stopping scheme.

A transmission implementing time repetition may be defined using three example processes. In the first example process, a custom MCS level, MCS_a, may be defined. Such a level may implement K time repetition or block-coding of a standard MCS0 level. To extend this example process, a hierarchy of repetitions may be defined as a set of custom MCS levels.

In the second example process, a custom transmission mode may be defined for time repetition. Such a transmission mode may indicate a K time repetition or block-coding of a packet using the signaled MCS level. As such, this may be considered to be an orthogonal definition to the MCS level concept.

In both example processes discussed above, the Physical Layer (PHY) packet length can be signaled before repetition or after repetition.

In the third example process, time repetition is defined implicitly. The transmission mode used at the transmitter may be defined at 602, to define it, the transmitter signals only the baseline MCS level and the packet length before repetition. At 604, the receiver may receive an input of signals corresponding to the data for transmission, as well as the specified transmission mode. Based on the received transmission mode, at 606, the MCS level and packet length are detected by the receiver. If repetition-wise interleaving is applied (which may use bit level or symbol level repetition), the repetition factor may then be implicitly detected: at 608, the receiver may begin to decode the packet without further knowledge of the repetition mode used. After a set of signals corresponding to the packet length have been received, energy detection circuitry may indicate that the transmitter is still transmitting. The receiver may then realize that one repetition is concatenated, and may choose to keep awake and continue to receive, or the receiver may choose to sleep and return to sense the channel after the same length of duration. At 610, the receiver may determine a factor of repetition after the transmitter finishes transmitting the repeated packet.

If consecutive OFDM symbol interleaving is applied (which may use bit level or symbol level repetition), the repetition factor may also be signaled implicitly. As in the case of repetition-wise interleaving, the transmission mode is defined by the packet length before repetition and the baseline MCS level at 602, received at the receiver at 604, and the packet length and MCS level are detected at 606. The receiver, upon decoding a limited number of OFDM symbols at 608, may use a hypothetic repetition detector to test whether the symbols are repeated signals, using the received packet length and baseline MCS. At 610, after the first repetition is identified and the factor of repetition has been detected, the receiver has full knowledge of the repetition being used by the transmitter.

While various embodiments of the present disclosure have been shown and described herein, it will be obvious to those skilled in the art that such embodiments are provided by way of example only. Numerous variations, changes, and substitutions will now occur to those skilled in the art without departing from the disclosure. It should be understood that various alternatives to the embodiments of the disclosure described herein may be employed in practicing the disclosure. It is intended that the following claims define the scope of the disclosure and that methods and structures within the scope of these claims and their equivalents be covered thereby.

The foregoing is merely illustrative of the principles of this disclosure, and various modifications can be made without departing from the scope of the present disclosure. The above-described embodiments of the present disclosure are presented for purposes of illustration and not of limitation, and the present disclosure is limited only by the claims that follow.

What is claimed is:

1. A method for extending the range of a transmitter by time repetition, the method comprising:
   storing a sequence of mapping patterns that map a constellation of symbols to a subset of carriers;
   cyclically selecting, at each time interval for each of a plurality of symbols, a mapping pattern of the sequence of mapping patterns according to the sequence such that a first mapping pattern in the sequence is reselected after a last mapping pattern in the sequence;
   receiving, at a transmitter block, an input of signals corresponding to data for transmission that includes the plurality of symbols; and
   mapping, based on the first mapping pattern, the plurality of symbols to a first subset of carriers;
   transmitting the plurality of symbols using the first subset of subcarriers;
   repeating the plurality of symbols, reordering the plurality of symbols, and mapping, based on a second mapping pattern, the reordered plurality of symbols to a second set of subcarriers, wherein the second mapping pattern is chosen using the cyclically selected mapping pattern; and
   retransmitting the reordered plurality of symbols using the second set of subcarriers.

2. The method of claim 1, wherein the transmitter block used for repeating the signals and reordering the signals comprises at least one of a repetition and symbol level interleaver, repetition and OFDM symbol interleaver, and repetition and interleaving block.

3. The method of claim 2, wherein the repetition and interleaving block receives signals processed by an encoder.

4. The method of claim 2, wherein the repetition and interleaving block receives signals unprocessed by an encoder.

5. The method of claim 1, wherein the transmitter block comprises at least one of a time-dependent symbol-to-subcarrier mapper and a time-dependent interleaver for mapping a first plurality of consecutive symbols of the reordered plurality of symbols to subcarriers using the second mapping pattern of the sequence of mapping patterns during a first time interval and a second plurality of consecutive symbols of the reordered plurality of symbols to subcarriers using a third mapping pattern of the sequence of mapping patterns during a second time interval, wherein a number of symbols in the first plurality of symbols equals a number of symbols in the second plurality of symbols.

6. The method of claim 1, further comprising the transmitter block arranging the input of signals into at least one of a grouping of bits and a grouping of symbols.

7. The method of claim 1, wherein reordering the signals further comprises at least one of consecutive signal interleaving and repetition-wise interleaving.

8. The method of claim 1, further comprising:
   specifying, at the transmitter, a transmission mode;
   receiving, at a receiver, an input of signals corresponding to the data for transmission and the specified transmission mode; and
   operating on the signals at the receiver, based on the specified transmission mode.

9. The method of claim 8, wherein specifying a transmission mode further comprises selecting at least one of a custom MCS level and packet length, a transmission mode and packet length, and an MCS level and a packet length.

10. The method of claim 8, wherein operating on the signals at the receiver further comprises:
    detecting an MCS level and a packet length;
    decoding the signals; and
    based on the decoding, determining a repetition factor used by the transmitter.

11. A system for extending the range of a transmitter by time repetition, the system comprising:
    a transmitter configured to send data to a receiver; and
    control circuitry configured to:
    (i) store a sequence of mapping patterns that map a constellation of symbols to a subset of carriers;
    (ii) cyclically select, at each time interval for each of a plurality of symbols, a mapping pattern of the sequence of mapping patterns according to the sequence such that a first mapping pattern in the sequence is reselected after a last mapping pattern in the sequence;
    (iii) receive at a transmitter block an input of signals corresponding to data for transmission that includes the plurality of symbols;
    (iv) map, via the first mapping pattern, the plurality of symbols to a first subset of carriers;
    (v) transmit the plurality of symbols using the first subset of subcarriers;
    (vi) repeat the plurality of symbols, reorder the plurality of symbols, and map, via a second mapping pattern, the reordered plurality of symbols to a second subset of subcarriers, wherein the second mapping pattern is chosen using the cyclically selected mapping pattern; and (vii) retransmit the reordered plurality of symbols using the second set of subcarriers.

12. The system of claim 11, wherein the transmitter block used for repeating the signals and reordering the signals is at least one of a repetition and symbol level interleaver, repetition and OFDM symbol interleaver, and repetition and interleaving block.

13. The system of claim 12, wherein the repetition and interleaving block receives signals processed by an encoder.

14. The system of claim 12, wherein the repetition and interleaving block receives signals unprocessed by an encoder.

15. The system of claim 11, wherein the transmitter block comprises at least one of a time-dependent symbol-to-subcarrier mapper and a time-dependent interleaver for mapping a first plurality of consecutive symbols of the reordered plurality of symbols to subcarriers using the second mapping pattern of the sequence of mapping patterns during a first time interval and a second plurality of consecutive symbols of the reordered plurality of symbols to subcarriers using a third mapping pattern of the sequence of mapping patterns during a second time interval, wherein a number of symbols in the first plurality of symbols equals a number of symbols in the second plurality of symbols.

16. The system of claim 11, wherein the transmitter block is configured to arrange the input of signals into at least one of a grouping of bits and a grouping of symbols.

17. The system of claim 11, wherein the control circuitry reordering the signals is further configured to perform at least one of consecutive signal interleaving and repetition-wise interleaving.

18. The system of claim 11, further comprising control circuitry configured to:
specify, at the transmitter, a transmission mode;
receive, at a receiver, an input of signals corresponding to the data for transmission and the specified transmission mode; and
operate on the signals at the receiver, based on the specified transmission mode.

19. The system of claim 18, wherein the control circuitry specifying a transmission mode is further configured to:
select at least one of a custom MCS level and packet length, a transmission mode and packet length, and an MCS level and a packet length.

20. The system of claim 18, wherein the control circuitry operating on the signals at the receiver is further configured to:
detect an MCS level and a packet length;
decode the signals; and
based on the decoding, determine a repetition factor used by the transmitter.

* * * * *